US012399663B2

(12) United States Patent
Imai et al.

(10) Patent No.: US 12,399,663 B2
(45) Date of Patent: Aug. 26, 2025

(54) INFORMATION PROCESSING APPARATUS, NON-TRANSITORY COMPUTER READABLE MEDIUM, AND INFORMATION PROCESSING METHOD FOR HANDLING SETTING CHANGES

(71) Applicant: FUJIFILM Business Innovation Corp., Tokyo (JP)

(72) Inventors: Tomoya Imai, Yokohama (JP); Daichi Inoue, Yokohama (JP); Marie Amaki, Yokohama (JP); Atsushi Mikami, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 396 days.

(21) Appl. No.: 17/882,826

(22) Filed: Aug. 8, 2022

(65) Prior Publication Data

US 2023/0319206 A1    Oct. 5, 2023

(30) Foreign Application Priority Data

Mar. 29, 2022    (JP) .................................. 2022-054020

(51) Int. Cl.
*G06F 3/12* (2006.01)

(52) U.S. Cl.
CPC .......... *G06F 3/1257* (2013.01); *G06F 3/1204* (2013.01); *G06F 3/1232* (2013.01); *G06F 3/1285* (2013.01); *G06F 3/1291* (2013.01)

(58) Field of Classification Search
CPC .... G06F 3/1257; G06F 3/1204; G06F 3/1232; G06F 3/1285; G06F 3/1291
See application file for complete search history.

(56) References Cited

U.S. PATENT DOCUMENTS

| 7,898,676 | B2 | 3/2011 | Igarashi et al. |
| 8,363,248 | B2 * | 1/2013 | Matsui .................. G06F 3/1214 |
| | | | 358/1.9 |
| 9,600,210 | B2 * | 3/2017 | Asahara ............. H04N 1/00344 |
| 2004/0257604 | A1 * | 12/2004 | Morooka ............... G06F 3/1204 |
| | | | 358/1.14 |
| 2007/0127042 | A1 | 6/2007 | Igarashi et al. |

(Continued)

FOREIGN PATENT DOCUMENTS

| JP | 2004-259058 A | 9/2004 |
| JP | 2007-106095 A | 4/2007 |

(Continued)

OTHER PUBLICATIONS

Mar. 25, 2025 Office Action issued in European Patent Application No. 22192954.0.

(Continued)

*Primary Examiner* — Nicholas Pachol
(74) *Attorney, Agent, or Firm* — Oliff PLC (57) ABSTRACT

An information processing apparatus includes a processor configured to: acquire information regarding a setting change performed in a different information processing apparatus having at least one setting item common to a setting item of the information processing apparatus; rate the acquired information on a basis of a relationship with setting content that is content of a setting in the information processing apparatus; and present the rated information to a user.

12 Claims, 5 Drawing Sheets

(56) References Cited

U.S. PATENT DOCUMENTS

| | | | | |
|---|---|---|---|---|
| 2007/0185979 A1* | 8/2007 | Yoshida | ................ | G06F 3/1285 |
| | | | | 709/220 |
| 2007/0279655 A1* | 12/2007 | Murakawa | ............... | H04N 1/00 |
| | | | | 358/1.9 |
| 2007/0300216 A1* | 12/2007 | Miyagi | ................ | G06F 3/1288 |
| | | | | 717/168 |
| 2016/0036631 A1* | 2/2016 | Shibata | .................. | G06F 11/00 |
| | | | | 709/221 |
| 2017/0289369 A1 | 10/2017 | Okayama | | |
| 2018/0136882 A1* | 5/2018 | Shinosaki | ............. | G06F 3/1287 |
| 2021/0349621 A1* | 11/2021 | Hirota | .................. | G06F 3/0482 |
| 2022/0317945 A1* | 10/2022 | Morikawa | ............. | G06F 3/1208 |
| 2023/0305777 A1* | 9/2023 | Hosomizo | ............. | G06F 3/1284 |

FOREIGN PATENT DOCUMENTS

| | | | |
|---|---|---|---|
| JP | 2015-177522 A | 10/2015 | |
| JP | 2017-042998 A | 3/2017 | |

OTHER PUBLICATIONS

May 12, 2023 Search Report issued in European Patent Application No. 22192954.0.

\* cited by examiner

Apparatus A: Custom medium [CustomABC] change

"Custom medium ABC" set for sheet tray 2 in this apparatus was changed in Apparatus A.
To apply change to this apparatus, press Apply button.

Before change
☐ Custom medium ABC
  Sheet size:    A4 (210×297 mm)
  Sheet type:    Plain paper
  Basic weight:  90

After change
☐ Custom medium ABC
  Sheet size:    A4 (210×297 mm)
  Sheet type:    Recycled paper
  Basic weight:  200

[Apply]  — 144a
[Cancel] — 144b

INFORMATION PROCESSING APPARATUS, NON-TRANSITORY COMPUTER READABLE MEDIUM, AND INFORMATION PROCESSING METHOD FOR HANDLING SETTING CHANGES

CROSS-REFERENCE TO RELATED APPLICATIONS

This application is based on and claims priority under 35 USC 119 from Japanese Patent Application No. 2022-054020 filed Mar. 29, 2022.

BACKGROUND

(i) Technical Field

The present disclosure relates to an information processing apparatus, a non-transitory computer readable medium, and an information processing method.

(ii) Related Art

In a situation where multiple apparatuses such as image forming apparatuses having functions of the same type are used, a setting of one of the apparatuses is intended to be used for a different one of the apparatuses in some cases. In such cases, individually setting the apparatuses requires much effort. In the related art, setting information is utilized for a sharable setting item, and thus a setting of an apparatus is made usable for a different apparatus.

Japanese Unexamined Patent Application Publication No. 2017-42998 discloses an image forming system in which a first image forming apparatus has parameters for a sheet profile that include a parameter also usable for a second image forming apparatus, and the sheet profile is made usable for the second image forming apparatus to use the parameter for the second image forming apparatus.

SUMMARY

In a case where a setting is changed in one of multiple apparatuses having the functions of the same type, the setting change is intended to be reflected on a different one of the apparatuses on occasions. However, it requires effort to output setting information every time a setting is changed in the apparatus and set the setting information in the different apparatus by using the output setting information.

Aspects of non-limiting embodiments of the present disclosure relate to enabling a setting change to be reflected on and set in an apparatus, the setting change being performed in a different apparatus. The setting change is made settable in the apparatus in such a manner that information regarding the setting change performed in the different apparatus is rated on the basis of a relationship with the content of a setting in the apparatus and then presented.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: acquire information regarding a setting change performed in a different information processing apparatus having at least one setting item common to a setting item of the information processing apparatus; rate the acquired information on a basis of a relationship with setting content that is content of a setting in the information processing apparatus; and present the rated information to a user.

BRIEF DESCRIPTION OF THE DRAWINGS

An exemplary embodiment of the present disclosure will be described in detail based on the following figures, wherein.

DETAILED DESCRIPTION

Hereinafter, an exemplary embodiment of the present disclosure will be described in detail with reference to the attached drawings.

System Configuration

Figure 1:
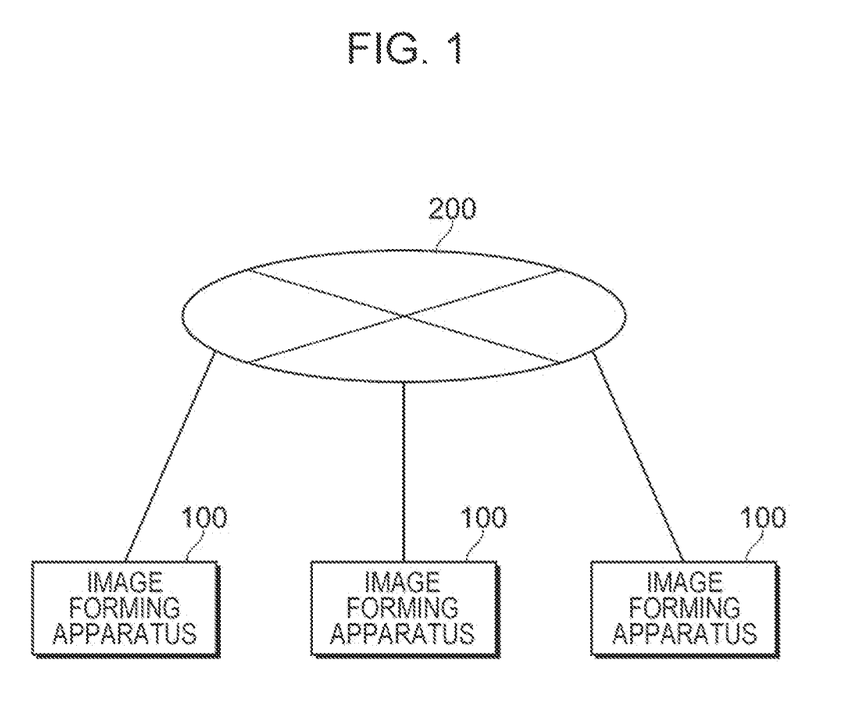
FIG. 1 is a view illustrating an example configuration of a system to which this exemplary embodiment is applied.

FIG. 1 is a view illustrating the configuration of a system to which this exemplary embodiment is applied. The system illustrated in FIG. 1 includes multiple information processing apparatuses 100 connected via a network 200. The models of the information processing apparatuses 100 are not limited to the same model, but the information processing apparatuses 100 have at least one common setting item. Via the network 200, the information processing apparatuses 100 share information regarding the content of a setting or a set value (hereinafter, simply described as setting content) regarding at least the common setting item. In this exemplary embodiment, a case where an image forming apparatus is used as an example of each information processing apparatus 100. Hereinafter, the image forming apparatus serving as the information processing apparatus 100 in this exemplary embodiment is described as an image forming apparatus 100.

The network 200 is not particularly limited. Any network usable for data communication among the image forming apparatuses 100 is usable. For example, the network 200 may be implemented by a local area network (LAN), a wide area network (WAN), the Internet, or the like. For the data communication, any wired or wireless communication network may be used and both of these may also be used. The image forming apparatuses 100 may be connected via multiple networks or communication lines by using a relay device such as a gateway, a router, or an access point.

Apparatus Configuration

Figure 2:
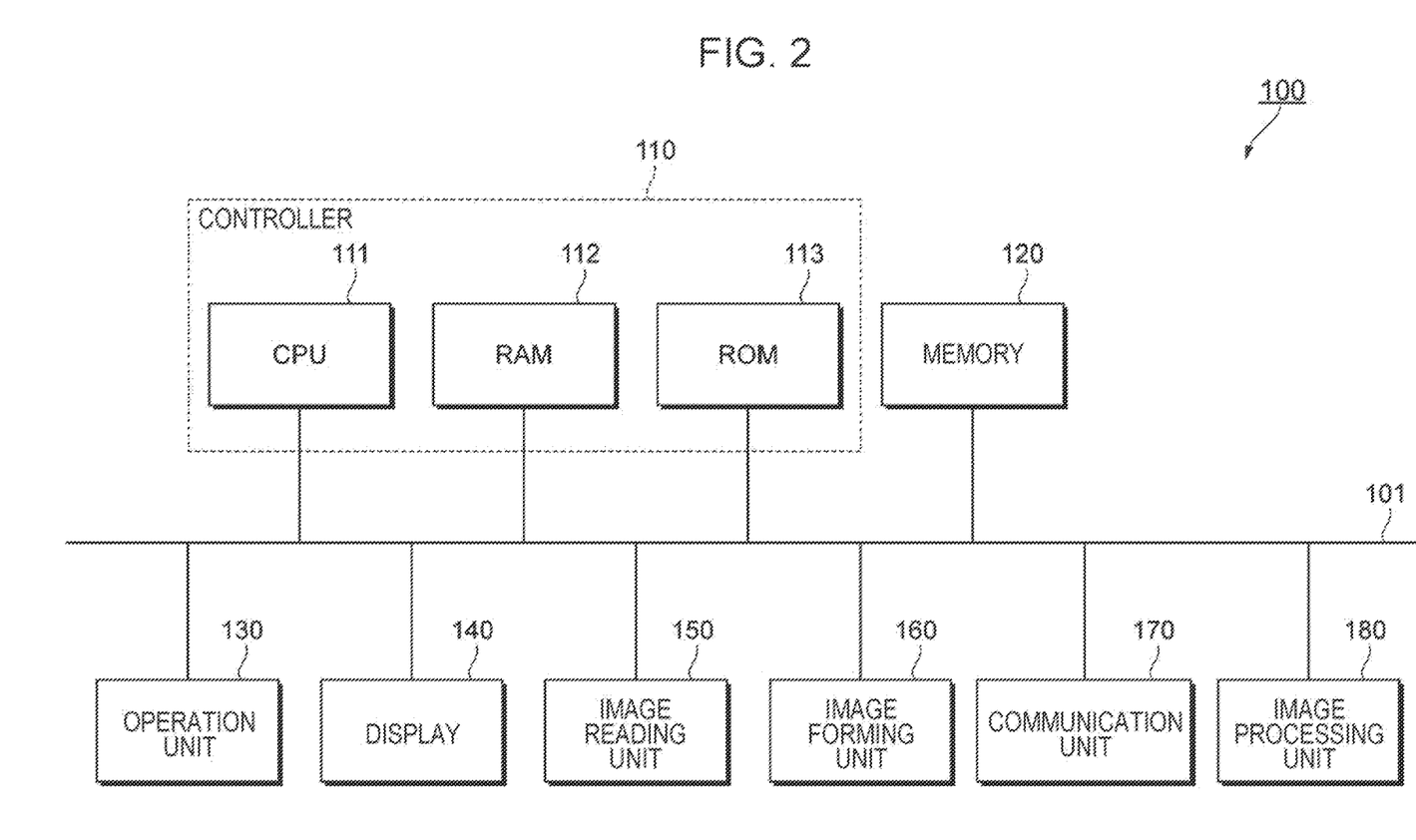
FIG. 2 is a view illustrating the configuration of an image forming apparatus to which this exemplary embodiment is applied.

FIG. 2 is a view illustrating the configuration of the image forming apparatus to which this exemplary embodiment is applied. The image forming apparatus 100 includes a controller 110, a memory 120, an operation unit 130, a display 140, an image reading unit 150, an image forming unit 160, a communication unit 170, and an image processing unit 180. These functional units are connected to a bus 101 and exchange data via the bus 101.

The controller 110 controls the aforementioned functional units of the image forming apparatus 100. The controller 110 is a functional unit that executes various data processing. The controller 110 includes a central processing unit (CPU) 111 serving as a computing unit, a random access memory (RAM) 112 serving as a memory, and a read only memory (ROM) 113. The RAM 112 is a main memory and is used as a working memory when the CPU 111 performs arithmetic operations. The ROM 113 holds programs and data such as set values prepared in advance. The CPU 111 reads a program or data directly from the ROM 113 and performs processing. The programs and the data are also stored in the memory 120. The CPU 111 loads a program stored in the memory 120 into the RAM 112 and then runs the program.

In this exemplary embodiment, the CPU 111 of the controller 110 loads and runs the program and thereby implements various functions (described later). The functions implemented in this exemplary embodiment include a function of receiving information regarding a setting change from a different one of the image forming apparatuses 100, a function of generating and displaying a report screen based on the setting change information, a function of transmitting, to the different image forming apparatus 100, the setting information changed in the image forming apparatus 100, and other functions.

The memory 120 is a functional unit that stores not only the programs to be run by the CPU 111 and the data as described above but also various pieces of data generated in various operations, such as data regarding an image read by the image reading unit 150. The memory 120 is implemented by a memory device such as a magnetic disk device or a solid state drive (SSD). In this exemplary embodiment, setting information of the image forming apparatus 100 and setting change information received from the different image forming apparatus 100 are held, for example, in the memory 120.

The operation unit 130 is a functional unit that receives an operation performed by a user. The operation unit 130 is composed of, for example, hardware keys and a touch sensor that outputs a control signal based on a location of a portion pressed or touched by a finger or the like. The operation unit 130 may be composed of a touch panel having the touch sensor combined with a liquid crystal display included in the display 140.

The display 140 is a functional unit that displays an information image that presents various pieces of information to the user, a preview image of an image to be processed for reading, outputting, or the like, an operation image for the user to perform an operation, and other images. The display 140 includes, for example, the liquid crystal display. The operation unit 130 and the display 140 that are described above may be combined to be used as a user interface for the user to input and output information to and from the image forming apparatus 100.

The image reading unit 150 is a functional unit that optically reads an image on the document. As an image reading system, for example, a charge coupled device (CCD) system or a contact image sensor (CIS) system is used. In a CCD system, light beams emitted from a light source to the document and reflected from the document are reduced by a lens and received by CCDs. In the CIS system, light beams serially emitted from a light emitting diode (LED) light source to the document and reflected from the document are received by a CIS.

The image forming unit 160 is a functional unit that forms an image based on image data on a medium such as a paper sheet by using an image forming material. As a system for forming an image on the medium, for example, an electrophotographic system is used. In the electrophotographic system, toner is used as an image forming material, and an image is formed by transferring the toner adhered to a photoconductor onto a medium. Hereinafter, a medium on which an image is formed is collectively referred to as a sheet.

The communication unit 170 is a functional unit that transmits and receives a command and data to and from an external apparatus. An interface supporting a method for communications with the external apparatus is used as the communication unit 170. The communication unit 170 may be connected to the external apparatus via a network or directly. The communication network may be a wired or wireless network.

The image processing unit 180 includes a processor serving as a computing unit and a working memory. The image processing unit 180 is a functional unit that performs image processing such as color correction or tone correction on an image represented by image data. The CPU 111 and the RAM 112 of the controller 110 may respectively serve as the processor and the working memory.

Setting Information of Image Forming Apparatus 100

Setting information of the image forming apparatus 100 used in this exemplary embodiment will be described. The image forming apparatus 100 holds setting information regarding various setting items for a printing process and other processes and controls operations related to the printing process and other processes. For example, the image forming apparatus 100 has a function of controlling the operations of the image forming unit 160 for controlling a printing quality. In addition, the image forming apparatus 100 holds a sheet attribute setting associated with a sheet and setting information associated with a sheet tray. The image forming apparatus 100 also has a function of controlling the printing quality on the basis of setting information for a sheet and a sheet tray to be used in printing.

In more detail, examples of the function of controlling the operations of the image forming unit 160 include automatic tone correction, in-plane density correction, automatic banding correction, and maximum density correction. The sheet attribute setting represents setting information in which settings regarding basic attributes of a sheet, sheet-specific printing, and the operations of the image forming unit 160 are collectively recorded. Examples of the basic attributes of a sheet include the size, color, and the basis weight of the sheet. Examples of the content of the setting regarding the sheet-specific printing and the operations of the image forming unit 160 include a fusing temperature, a productivity setting, and an aligner roll pressure. Examples of the printing quality control performed on the basis of a sheet attribute setting or setting information associated with a sheet tray include transfer output control, alignment control, folding location adjustment, air-assist control, and sheet curl correction.

The setting and controlling as described above are performed regularly in consideration for, for example, the number of printed sheets, a period of time of printing, and an amount of toner and a consumable used. In some cases, the setting and controlling are also performed at an appropriate time depending on, for example, the state of the image forming unit 160 or the printing quality change influenced by an amount of remaining toner, the state of a consumable, or the like. Hereinafter, the setting and the controlling are collectively referred to as setting. However, when the setting and the controlling are distinguished, the term "setting and controlling" or the like is used in some cases.

Sharing Setting Change Information

In a case where the multiple image forming apparatuses 100 operate on the same floor or in the same building, a setting change performed on one of the image forming apparatuses 100 depending on an operation environment or an operation state is to be reflected on a different one of the image forming apparatuses 100 on occasions. However, performing the various setting operations individually on the image forming apparatuses 100 requires much effort. In addition, even if each image forming apparatus 100 operates in a similar environment on the same floor or in the same building, the image forming apparatus 100 requires fine adjustment depending on the case. Even if a new setting in one of the image forming apparatuses 100 that has undergone a setting change is duplicated on a different one of the image forming apparatuses 100 without any modification, verification is required for individual setting items and thus takes effort.

In this exemplary embodiment, if one of the various settings that has its content recorded therein is changed in one of the image forming apparatuses 100, the image forming apparatus 100 transmits information regarding the changed setting, not whole settings as new settings, to a different one of the image forming apparatuses 100 via the network 200. Information regarding the setting change performed in one of the image forming apparatuses 100 is thereby shared by the image forming apparatuses 100. After receiving the information regarding the changed setting, an image forming apparatus 100 rates the received information and presents the result to the user. The received information is presented to the user, for example, in such a manner as to be displayed on the display 140.

Rating Setting Change Information

The controller 110 of each image forming apparatus 100 in this exemplary embodiment (see FIG. 2) rates and presents the setting change information received from the different image forming apparatus 100 on the basis of a level of relevance to the image forming apparatus 100. The relevance level represents how relevant the reflection of the setting change on the image forming apparatus 100 is, on the basis of a relationship between the received setting change information and the content of the corresponding setting held in the image forming apparatus 100. The higher relevance level of the setting change is, the more likely to relevant the reflection on the image forming apparatus 100 is.

In this exemplary embodiment, the controller 110 first rates a setting item for the setting change on the basis of whether the setting content regarding a setting item in the image forming apparatus 100 is the same as the setting content regarding a setting item in a setting before the setting change in the different image forming apparatus 100 having undergone the setting change. If the setting content is not the same as the setting content in the setting before the setting change in the different image forming apparatus 100 having undergone the setting change, the controller 110 sets the relevance level Low for the setting item in the received setting information.

Subsequently, the controller 110 further rates the setting item regarding the same setting content as the setting content in the setting before the setting change in the different image forming apparatus 100 having undergone the setting change. The controller 110 rates the setting item on the basis of whether the image forming apparatus 100 is in a state where processing using the setting content regarding the setting item is executable. If the image forming apparatus 100 is in the executable state, the controller 110 sets the relevance level of the setting item High. If the image forming apparatus 100 is not in the executable state, the controller 110 sets the relevance level of the setting item Medium.

The relevance level of a setting item is further described. The setting information of the image forming apparatus 100 is associated with a sheet or a tray on which the sheet is placed (hereinafter, referred to as a sheet profile). The controller 110 of the image forming apparatus 100 rates a sheet profile received from the different image forming apparatus 100 having undergone the setting change. The controller 110 first rates the sheet profile on the basis of whether the setting content of the sheet profile in the image forming apparatus 100 is the same as the setting content of the sheet profile in a setting before the setting change in the different image forming apparatus 100 having undergone the setting change. If the setting content in the image forming apparatus 100 is not the same as the setting content in the setting before the setting change in the different image forming apparatus 100 having undergone the setting change, the controller 110 sets the relevance level of the received sheet profile Low.

The controller 110 further rates the sheet profile having the same setting content as the setting content of the sheet profile in the setting before the setting change in the different image forming apparatus 100 having undergone the setting change. The controller 110 rates the sheet profile on the basis of whether the sheet profile is assigned to a sheet or a tray in the image forming apparatus 100. If the sheet profile is assigned to a sheet or a tray in the image forming apparatus 100, the controller 110 sets the relevance level High. If the sheet profile is not assigned thereto, the controller 110 sets the relevance level Medium.

Note that if sheet profiles having the same setting content are assigned the same identification (profile ID), the sheet profile may be rated on the basis of whether the sheet profile has the same identification as that of the sheet profile received from the different image forming apparatus 100 having undergone the setting change. In this case, if the image forming apparatus 100 does not have a sheet profile with the same identification, the controller 110 sets the relevance level of the received sheet profile Low. If the image forming apparatus 100 has a sheet profile with the same identification as the identification of the sheet profile received from the different image forming apparatus 100 having undergone the setting change, and if the sheet profile with the same identification is assigned to a sheet or a tray, the controller 110 sets the relevance level High. If the image forming apparatus 100 has a sheet profile with the same identification, and if the sheet profile is not assigned to a sheet or a tray, the controller 110 sets the relevance level Medium.

The setting information of the image forming apparatus 100 is setting information provided for a sheet and is associated with a tray on which the sheet is placed (hereinafter, referred to as a sheet setting). The controller 110 of the image forming apparatus 100 rates the sheet setting received from the different image forming apparatus 100 having undergone the setting change. The controller 110 first rates the sheet setting on the basis of whether the image forming apparatus 100 has a sheet setting for a sheet having the same attribute. If the image forming apparatus 100 does not have a sheet setting for a sheet having the same attribute, the controller 110 sets the relevance level of the received sheet setting Low.

If the image forming apparatus 100 has a sheet setting for a sheet having the same attribute, the controller 110 then rates the sheet setting on the basis of whether the sheet setting is assigned to a tray in the image forming apparatus 100. If the sheet setting is assigned to a tray in the image forming apparatus 100, the controller 110 sets the relevance level High. If the sheet setting is not assigned, the controller 110 sets the relevance level Medium.

Example Screen Display

Figure 3:
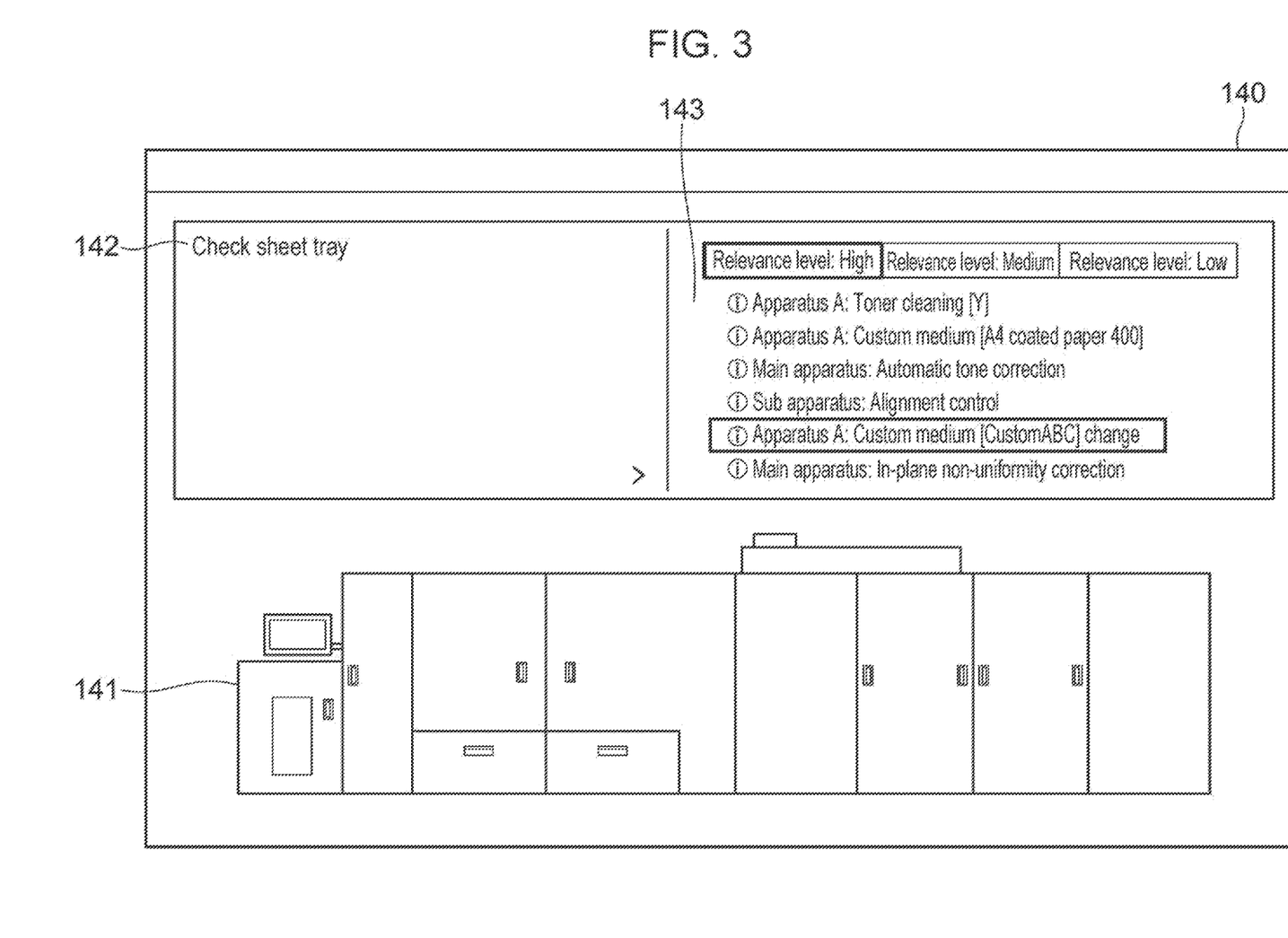
FIG. 3 is a view illustrating an example of displaying a report screen for reporting, to a user, setting change information received from a different image forming apparatus.

FIG. 3 is a view illustrating an example of displaying a report screen for reporting, to the user, setting change information received from the different image forming apparatus 100. The report screen is displayed, for example, on the display 140 of the image forming apparatus 100 (see FIG. 2). FIG. 3 illustrates an apparatus image 141 of the image forming apparatus 100, a text area 142, and a setting-information display area 143. The apparatus image 141 illustrated in FIG. 3 represents the image forming apparatus 100 viewed from the front face of the image forming apparatus 100. In the text area 142, the message "Check sheet tray" prompting the user to check a setting target described in setting information. In the setting-information display area 143, the setting change information regarding the setting change and received from the different image forming apparatus 100 having undergone the setting change is displayed. The setting content of the setting target in the image forming apparatus 100 may also be displayed on the report screen, but this is not illustrated in FIG. 3. The identification of an image forming apparatus 100 having transmitted the setting change information may also be displayed.

In the setting-information display area 143, tabs representing the relevance levels described above and setting information rated as the relevance level represented by the tab are displayed. In the example illustrated in FIG. 3, setting information rated as the relevance level High is displayed. As the setting information rated as the relevance level High, information for such setting items as "Apparatus A: Toner cleaning [Y]", "Apparatus A: Custom medium [A4 coated paper 400]", "Main apparatus: Automatic tone correction", "Sub apparatus: Alignment control", "Apparatus A: Custom medium [CustomABC] change", and "Main apparatus: In-plane non-uniformity correction" is displayed. The user refers to the setting information displayed in the setting-information display area 143 and thus may consider whether there is a setting change to be reflected on the image forming apparatus 100.

The setting information displayed in the setting-information display area 143 functions as an operation screen for moving the display on the display 140 to a detail screen for displaying the details of the information. The user selects a setting item intended to verify the details from the setting information displayed in the setting-information display area 143 and causes the screen to move to the detail screen for the selected setting item. For example, if the operation unit 130 of the image forming apparatus 100 (see FIG. 2) is implemented by a touch panel, the setting item is selected in such a manner that the user touches, on the UI screen, a portion of an image of a consumable intended to be selected (in other words, a replaced consumable).

Figure 4:
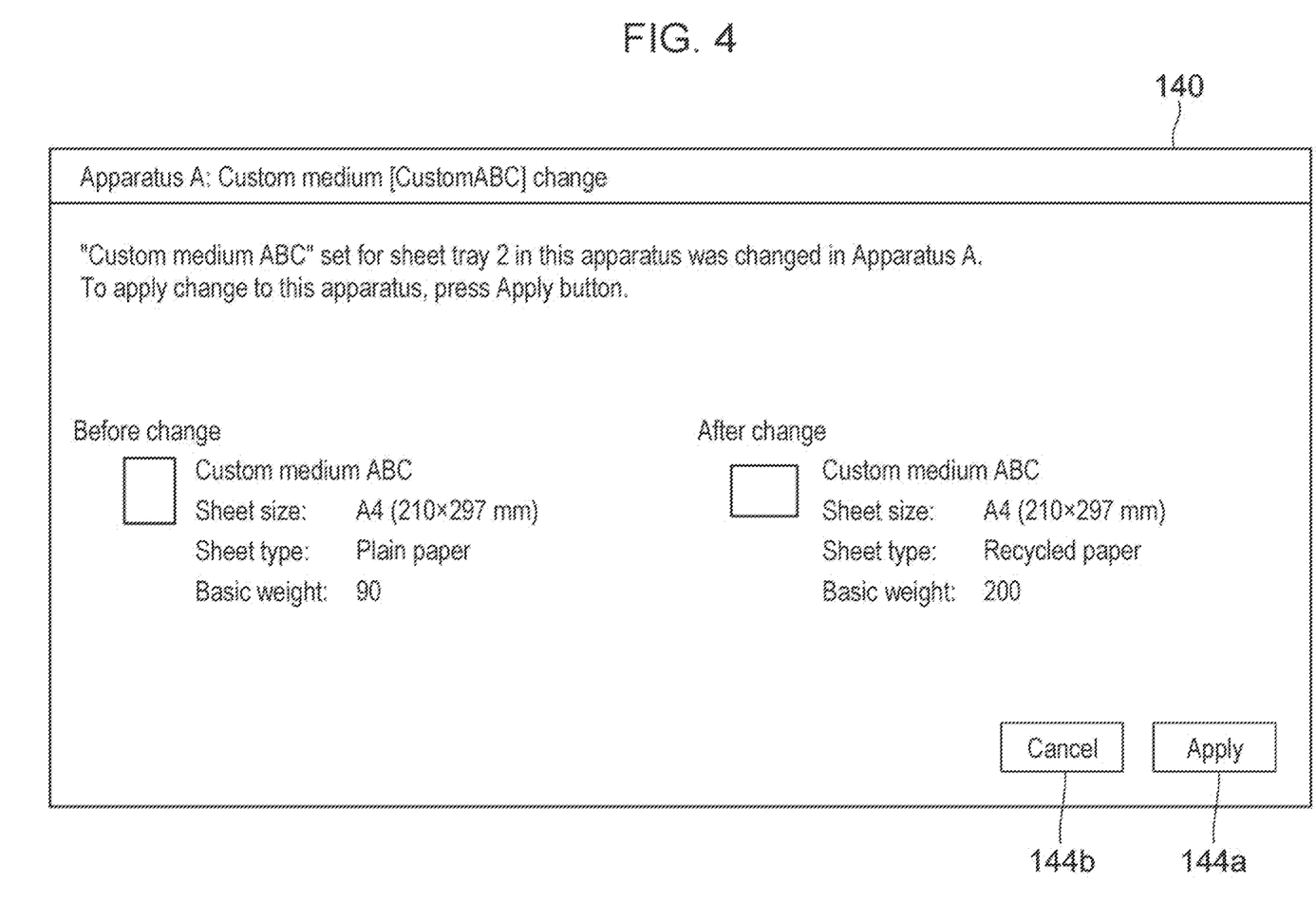
FIG. 4 is a view illustrating an example of displaying a detail screen.

FIG. 4 is a view illustrating an example of displaying the detail screen. The detail screen illustrated in FIG. 4 is displayed after the setting item "Apparatus A: Custom medium [CustomABC] change" is selected on the report screen in FIG. 3. In the example illustrated in FIG. 4, the text "Apparatus A: Custom medium [CustomABC] change" representing the selected setting item is displayed in the headline of the screen. In addition to the content of the setting change, the text for prompting the user's determination "'Custom medium ABC' set for sheet tray 2 in this apparatus was changed in Apparatus A. To apply change to this apparatus, press Apply button." is displayed. Respective pieces of setting information before and after the change are also displayed in comparison with each other.

On the detail screen, a button object 144*a* (Apply) for giving an instruction to apply the setting change and a button object 144*b* (Cancel) for terminating the displaying of the detail screen without applying the setting change are also displayed. In response to the user selecting the button object 144*a*, the controller 110 of the image forming apparatus 100 reflects the setting change displayed on the detail screen on the image forming apparatus 100 and causes the screen to return to the report screen illustrated in FIG. 3. In response to the selection of the button object 144*b*, the controller 110 terminates the displaying of the detail screen without reflecting the setting change on the image forming apparatus 100 and causes the screen to return to the report screen.

Operations of Image Forming Apparatus 100

Figure 5:
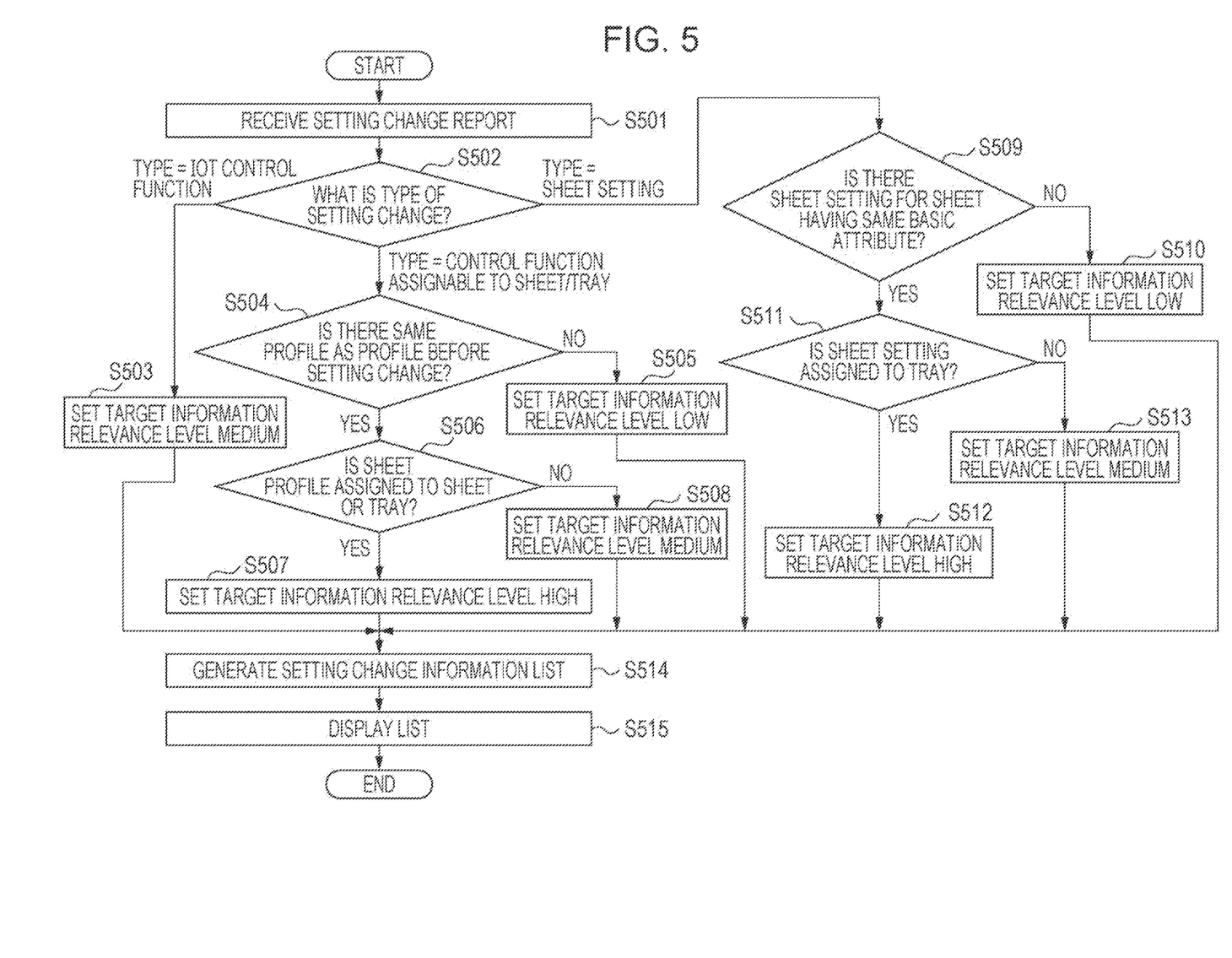
FIG. 5 is a flowchart illustrating operations related to sharing of a setting change in the image forming apparatus.

FIG. 5 is a flowchart illustrating operations related to sharing of a setting change in the image forming apparatus 100. After receiving a report of a setting change from the different image forming apparatus 100 (S501), the controller 110 of the image forming apparatus 100 determines the type of the setting change described in the received report (S502). If the type of the setting change relates to the control function of the image forming unit 160, the controller 110 sets the relevance level of target setting information (hereinafter, referred to as target information) Medium (S503).

If the type of the setting change relates to a control function assignable to a sheet or a tray, the controller 110 determines, regarding the received setting change information, whether the image forming apparatus 100 has a sheet profile having the same setting content as the setting content of a sheet profile in the setting before the setting change in the different image forming apparatus 100 having undergone the setting change. If the image forming apparatus 100 does not have the sheet profile (NO in S504), the controller 110 sets the relevance level of the target information Low (S505).

If the image forming apparatus 100 has a sheet profile having the same setting content as the setting content in the setting before the setting change in the different image forming apparatus 100 (YES in S504), the controller 110 determines whether the sheet profile is assigned to a sheet or a tray in the image forming apparatus 100. If the sheet profile is assigned (YES in S506), the controller 110 sets the relevance level of the target information High (S507). In contrast, if the sheet profile is not assigned to a sheet or a tray (NO in S506), the controller 110 sets the relevance level of the target information Medium (S508).

If the type of the setting change is a sheet setting, the controller 110 determines whether the image forming apparatus 100 has a sheet setting for a sheet having the same basic attribute as a basic attribute in the sheet setting in the received setting change information. If the image forming apparatus 100 does not have the sheet setting (NO in S509), the controller 110 sets the relevance level of the target information Low (S510).

If the image forming apparatus 100 has a sheet setting for a sheet having the same basic attribute (YES in S509), the controller 110 determines whether the sheet setting is assigned to a tray in the image forming apparatus 100. If the sheet setting is assigned (YES in S511), the controller 110 sets the relevance level of the target information High (S512). In contrast, if the sheet setting is not assigned to a tray (NO in S511), the controller 110 sets the relevance level of the target information Medium (S513).

After rating the received setting change information as described above, the controller 110 generates a setting change information list for each rated relevance level (S514). The controller 110 then causes the generated list to be displayed on the display 140 (S515).

Transmitting Setting Change Information

In any one of the image forming apparatuses 100 in this exemplary embodiment, by operating the operation unit 130, the user may designate, as a sharer of setting information, a different one of the image forming apparatuses 100 connectable via the network 200. The controller 110 receives the designation operation by the user, registers the designated image forming apparatus 100 as a sharer of the setting change information, and holds connection information (such as an address or the like on the network 200) in the memory 120 or the like. If a setting is changed in the image forming apparatus 100, the controller 110 transmits information regarding the setting change to the different image forming apparatus 100 and shares the information.

Note that in a function implemented by software, the controller 110 may operate to search for a sharer candidate image forming apparatus 100 having at least one setting item common to a setting item of the image forming apparatus 100 via the network 200 and to register the sharer candidate image forming apparatus 100 as the sharer.

Modification

The exemplary embodiment of the present disclosure has heretofore been described. The technical scope of the present disclosure is not limited to the aforementioned exemplary embodiment. For example, in the configuration in the exemplary embodiment above, one of the image forming apparatuses 100 having undergone the setting change transmits the setting change information to a different one of the image forming apparatuses 100 serving as the sharer. In contrast, the following configuration may also be provided. A shared server for sharing the setting change information is provided via the network 200, and one of the image forming apparatuses 100 having undergone the setting change transmits the setting change information to the shared server and causes the shared server to hold the setting change information. In this configuration, each image forming apparatus 100 may access the shared server, for example, regularly, search for information regarding a setting change that is performed by a different one of the image forming apparatuses 100 and that has not been reflected on the image forming apparatus 100, and acquire the setting change information if any.

In the exemplary embodiment above, the example of using the image forming apparatus as the information processing apparatus 100 has been described; however, application of this exemplary embodiment is not limited to the example above. This exemplary embodiment is applicable to various systems including multiple apparatuses having at least one common setting item and connected via the network 200. In addition, the present disclosure includes various modifications and configuration replacements without departing from the scope of the technical spirit.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
acquire information regarding a setting change performed in a different information processing apparatus having at least one setting item common to a setting item of the information processing apparatus;
rate the acquired information on a basis of a relationship with setting content that is content of a setting in the information processing apparatus; and
present the rated information to a user.

2. The information processing apparatus according to claim 1,
wherein the processor is configured to:
rate a setting item in the information, the rated setting item including a setting item regarding which the information processing apparatus has same setting content as setting content regarding a setting item in a setting before the setting change in the different information processing apparatus and a setting item regarding which the information processing apparatus does not have the same setting content.

3. The information processing apparatus according to claim 2,
wherein the processor is configured to:
further rate the setting item regarding which the information processing apparatus has the same setting content as the setting content regarding the setting item in the setting before the setting change in the different information processing apparatus, the rated setting item including a setting item regarding which the information processing apparatus is in a state where processing using the setting content regarding the setting item is executable and a setting item regarding which the information processing apparatus is not in the state where the processing is executable.

4. The information processing apparatus according to claim 1,
wherein the processor is configured to:
further rate a setting item regarding which the information processing apparatus has same setting content as setting content regarding a setting item in a setting before the setting change in the different information processing apparatus, the rated setting item including a setting item regarding which the information processing apparatus is in a state where processing using the setting content regarding the setting item is executable and a setting item regarding which the information processing apparatus is not in the state where the processing is executable.

5. The information processing apparatus according to claim 1,
wherein the information processing apparatus and the different information processing apparatus are each an image forming apparatus,
wherein the information is setting information associated with a medium on which an image is formed or a tray on which the medium is placed, and
wherein the processor is configured to rate the setting information, the rated setting information including setting information regarding which the information processing apparatus has same setting content as setting content of setting information in a setting before the setting change in the different information processing apparatus and setting information regarding which the information processing apparatus does not have the same setting content.

6. The information processing apparatus according to claim 5,
wherein the processor is configured to further rate the setting information regarding which the information processing apparatus has the same setting content as the setting content of the setting information in the setting before the setting change in the different information processing apparatus, the rated setting information including setting information assigned to the medium or the tray in the information processing apparatus and setting information not assigned to the medium or the tray.

7. The information processing apparatus according to claim 1,
wherein the information processing apparatus and the different information processing apparatus are each an image forming apparatus,
wherein the information is setting information that is provided for a medium on which an image is formed and that is associated with a tray on which the medium is placed,
wherein the processor is configured to rate the setting information including setting information for a medium having a same attribute in a setting in the information processing apparatus as an attribute of a medium in a setting before the setting change in the different information processing apparatus and setting information for the medium not having the same attribute.

8. The information processing apparatus according to claim 7,
wherein the processor is configured to further rate the setting information for the medium having the same attribute, the rated setting information including setting information assigned to the tray in the information processing apparatus and setting information not assigned to the tray.

9. The information processing apparatus according to claim 1,
wherein the processor is configured to:
receive a user operation for designating a sharer information processing apparatus that is to share information regarding a setting change, the sharer information processing apparatus being included in information processing apparatuses connectable to the information processing; and
hold information regarding the designated sharer information processing apparatus.

10. The information processing apparatus according to claim 9,
wherein the processor is configured to transmit the information regarding the setting change performed in the information processing apparatus to the sharer information processing apparatus.

11. A non-transitory computer readable medium storing a program causing a computer to execute a process comprising:
acquiring information regarding a setting change performed in a different information processing apparatus having at least one setting item common to a setting item of the information processing apparatus;
rating the acquired information on a basis of a relationship with content of a setting in the information processing apparatus; and
presenting the rated information to a user.

12. An information processing method comprising:
acquiring information regarding a setting change performed in a different information processing apparatus having at least one setting item common to a setting item of the information processing apparatus;
rating the acquired information on a basis of a relationship with content of a setting in the information processing apparatus; and
presenting the rated information to a user.

* * * * *